(12) United States Patent
Lu et al.

(10) Patent No.: US 11,327,572 B2
(45) Date of Patent: May 10, 2022

(54) WATERPROOF KEY MODULE

(71) Applicant: GOERTEK INC., Weifang (CN)

(72) Inventors: Gongtao Lu, Weifang (CN); Junhao Wang, Weifang (CN); De'an Liu, Weifang (CN); Tianduo Zhou, Weifang (CN)

(73) Assignee: WEIFANG GOERTEK MICROELECTRONICS CO., LTD., Shandong (CN)

( * ) Notice: Subject to any disclaimer, the term of this patent is extended or adjusted under 35 U.S.C. 154(b) by 603 days.

(21) Appl. No.: 16/319,525

(22) PCT Filed: Dec. 19, 2016

(86) PCT No.: PCT/CN2016/110683
§ 371 (c)(1),
(2) Date: Jan. 22, 2019

(87) PCT Pub. No.: WO2018/014496
PCT Pub. Date: Jan. 25, 2018

(65) Prior Publication Data
US 2021/0286439 A1    Sep. 16, 2021

(30) Foreign Application Priority Data
Jul. 22, 2016    (CN) .......................... 201610586643.8

(51) Int. Cl.
*H01H 13/06* (2006.01)
*G06F 3/02* (2006.01)
*H01H 13/14* (2006.01)

(52) U.S. Cl.
CPC ........... *G06F 3/0202* (2013.01); *H01H 13/06* (2013.01); *H01H 13/14* (2013.01);
(Continued)

(58) Field of Classification Search
None
See application file for complete search history.

(56) References Cited

U.S. PATENT DOCUMENTS 8,089,014 B2 * 1/2012 Maeda ................... H01H 13/06
200/302.1
8,232,493 B2 * 7/2012 Ichikawa ............... H01H 13/06
200/341

FOREIGN PATENT DOCUMENTS

CN        2465298 Y      12/2001
CN      101673633 A       3/2010
(Continued)

*Primary Examiner* — Felix O Figueroa
(74) *Attorney, Agent, or Firm* — Saliwanchik, Lloyd & Eisenschenk

(57) ABSTRACT

Disclosed is a waterproof key module, including: a housing with a hollow inner chamber and an opening at an end, comprising a front housing portion and a bottom housing portion secured to each other, and the opening being provided on the front housing portion; a touch component limited in the inner chamber, comprising a touch plate extending out from the opening; and a waterproof adhesive film in a pre-tensioned status and isolating the touch component from the bottom housing portion, an edge of the film being secured to a position where the front housing portion is connected to the bottom housing portion, and the touch component being supported on the film; wherein at least one pressure sensor module is provided between the touch component and the bottom housing portion and configured to generate a pressure signal that represents a pressure degree according to a pressing on the touch component.

8 Claims, 1 Drawing Sheet

(52) U.S. Cl.
CPC ... *H01H 2223/002* (2013.01); *H01H 2223/03* (2013.01); *H01H 2233/03* (2013.01)

(56) References Cited

FOREIGN PATENT DOCUMENTS

| | | |
|---|---|---|
| CN | 104282475 A | 1/2015 |
| CN | 106227357 A | 12/2016 |
| JP | S56124081 A | 9/1981 |
| JP | H1021777 A | 1/1998 |
| JP | H1021780 A | 1/1998 |
| JP | 2007042361 A | 2/2007 |
| JP | 2013114766 A | 6/2013 |

* cited by examiner

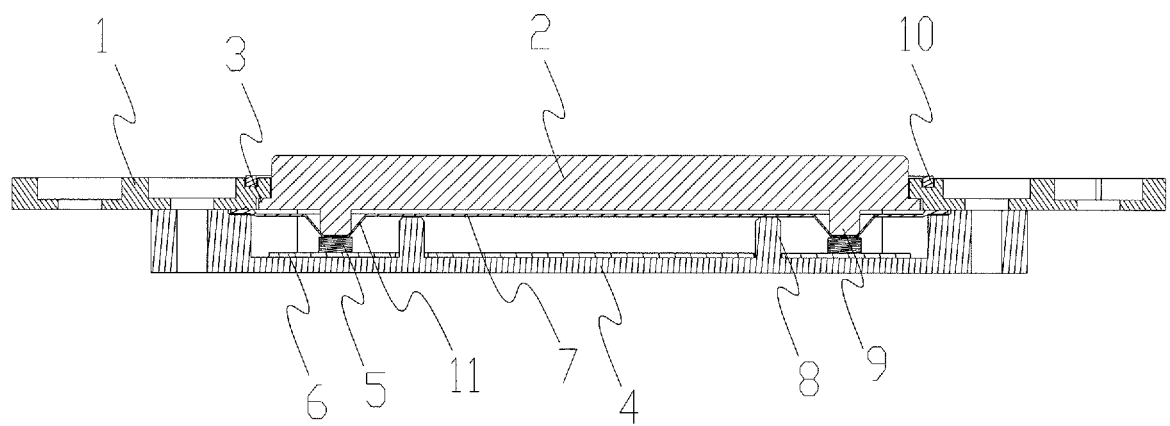

WATERPROOF KEY MODULE

CROSS REFERENCE TO RELATED APPLICATIONS

This application is a National Stage of International Application No. PCT/CN2016/110683, filed on Dec. 19, 2016, which claims priority to Chinese Patent Application No. 201610586643.8, filed on Jul. 22, 2016, both of which are hereby incorporated by reference in their entireties.

TECHNICAL FIELD

The present disclosure relates to the field of touch control technology and more particularly to a waterproof key module based on a pressure sensor.

BACKGROUND

With the development of technology, electronic devices, such as a mobile phone and a computer, have become indispensable in our lives. For example, a display screen and a volume key of the mobile phone are main control components of the mobile phone, and they are formed on a housing by means of post-assembly. In this traditional key module, there inevitably exists a gap, which allows a key structure to act, between the raised key structure and the housing, leading to poor water resistance and dustproof property of the key module. Consequently, the key module cannot be applied to some control fields demanding high standards on the environment.

Moreover, these keys usually need to protrude from the housing to facilitate operation, thus affecting an appearance of an integral machine.

SUMMARY

An objective of the present disclosure is to provide a waterproof key module.

According to one aspect of the present disclosure, there is provided a waterproof key module, comprising: a housing with a hollow inner chamber and an opening at an end, comprising a front housing portion and a bottom housing portion secured to each other, and the opening of the housing being provided on the front housing portion; a touch component limited in the inner chamber of the housing, comprising a touch plate extending out from the opening of the inner chamber of the housing; and a waterproof adhesive film in a pre-tensioned status and isolating the touch component from the bottom housing portion, an edge of the waterproof adhesive film being secured to a position where the front housing portion is connected to the bottom housing portion, and the touch component being supported on the waterproof adhesive film.

At least one pressure sensor module is provided between the touch component and the bottom housing portion and configured to generate a pressure signal that represents a pressure degree according to a pressing on the touch component.

Optionally, the touch component further comprises a flange structure provided at a lower edge of the touch plate, and is clamped in a stepped structure provided at the opening of the inner chamber of the housing by means of the flange structure.

Optionally, the pressure sensor module comprises a circuit board and a pressure sensor electrically connected to the circuit board.

Optionally, the pressure sensor module is secured to the bottom housing portion. A raised column to be in contact and matched with the pressure sensor is provided in a position of a lower end of the touch component directly facing the pressure sensor.

Optionally, the waterproof adhesive film covers a lower end face of the touch component. An embossed structure which has a shape matching with that of the raised column is formed at a position of the waterproof adhesive film corresponding to the raised column.

Optionally, the pressure sensor comprises two pressure sensors, namely a first pressure sensor and a second pressure sensor. The first pressure sensor and the second pressure sensor are respectively located at two ends of the touch component.

Optionally, a limiting column is further provided between the bottom housing portion and the touch component.

Optionally, the limiting column is secured to the bottom housing portion and extends toward the touch component; or, the limiting column is secured to a lower end of the touch component and extends toward the bottom housing portion.

Optionally, a first seal ring surrounding the inner chamber is disposed in the position where the front housing portion is connected to the bottom housing portion.

Optionally, a second seal ring surrounding the opening of the inner chamber of the housing is further disposed in a position on an end face of the front housing portion to be connected to an external terminal.

According to the key module, the touch component is supported on the waterproof adhesive film, so that the waterproof adhesive film could provide an elastic force for the touch component to restore. As the edge of the waterproof adhesive film is secured to the position where the front housing portion is connected to the bottom housing portion, and the touch component could be completely isolated from the bottom housing portion through the waterproof adhesive film, even if a gap exists between the touch component and the housing, water will not enter the bottom housing portion through the waterproof adhesive film. Thus, water resistance of the key module is achieved. The key module could be conveniently mounted on the external terminal for use and is superior and reliable in performance.

Further features of the present disclosure and advantages thereof will become apparent from the following detailed description of exemplary embodiments according to the present disclosure with reference to the attached drawings.

BRIEF DESCRIPTION OF THE DRAWINGS

The accompanying drawings, which are incorporated in and constitute a part of the specification, illustrate embodiments of the disclosure and, together with the description thereof, serve to explain the principles of the disclosure.

FIG. 1 is a structural schematic view of a key module according to the present disclosure.

DETAILED DESCRIPTION

Various exemplary embodiments of the present disclosure will now be described in detail with reference to the drawings. It should be noted that the relative arrangement of the components and steps, the numerical expressions, and numerical values set forth in these embodiments do not limit the scope of the present disclosure unless it is specifically stated otherwise.

The following description of at least one exemplary embodiment is merely illustrative in nature and is in no way intended to limit the disclosure, its application, or uses.

Techniques, methods and apparatus as known by one of ordinary skill in the relevant art may not be discussed in detail but are intended to be part of the specification where appropriate.

In all of the examples illustrated and discussed herein, any specific values should be interpreted to be illustrative only and non-limiting. Thus, other examples of the exemplary embodiments could have different values.

Notice that similar reference numerals and letters refer to similar items in the following FIGURES, and thus once an item is defined in one FIGURE, it is possible that it need not be further discussed for following FIGURES.

Referring to FIG. 1, the present disclosure provides a waterproof key module, comprising a housing with a hollow inner chamber and a touch component limited in the inner chamber of the housing. The housing comprises a front housing portion 1 and a bottom housing portion 4 which are secured to each other. The front housing portion 1 and the bottom housing portion 4 could be secured through a bolt to form the housing with the hollow inner chamber. An opening communicated with the inner chamber of the housing is formed in the front housing portion 1, so that the housing forms a semi-enclosed structure with one end opened and the other end closed. The front housing portion 1 and the bottom housing portion could be formed by injection molding or by machining of a metal part. To improve leakproofness between the front housing portion 1 and the bottom housing portion 4, a first seal ring surrounding the inner chamber could be disposed in a position where the front housing portion 1 is connected to the bottom housing portion 4.

Referring to FIG. 1, the touch component comprises a touch plate 2 extending out from the opening of the inner chamber of the housing. Since the touch plate 2 extends out from the opening of the housing, a user could perform corresponding operations through the tough plate 2. For example, the user could press an upper end and a lower end of the touch plate 2 or perform a sliding from one end of the touch plate 2 to the other end. The touch component is limited to be within the inner chamber of the housing to avoid disengagement from the housing. In a specific embodiment of the present disclosure, the touch component comprises a flange structure 3 disposed at an edge of the lower end of the touch plate 2 and matching with a stepped structure at the opening of the inner chamber of the housing. Such a manner of clamping by means of the flange structure and the stepped structure belongs to a common sense of those skilled in the art and therefore will not be specifically explained herein.

The waterproof key module further comprises a waterproof adhesive film 7 made of waterproof materials well known by those skilled in the art, preferably, TPU (Thermoplastic polyurethanes), PU (Polyurethane), etc. An edge of the waterproof adhesive film 7 is secured to the position where the front housing portion 1 is connected to the bottom housing portion 4. That is, the edge of the waterproof adhesive film 7 is pressed by a place where the front housing portion and the bottom housing portion are in contact with each other. Thus, the waterproof adhesive film 7 is secured. As the waterproof adhesive film 7 is located between the touch component and the bottom housing portion 4, the touch component is completely isolated from the bottom housing portion 4 by the waterproof adhesive film 7.

The touch component is partially or completely supported on the waterproof adhesive film 7, the waterproof adhesive film 7 as a whole being in a pre-tensioned status after being secured in the housing. As the waterproof adhesive film 7 has certain elasticity, the touch component pressed by the user will at its lower end compress the waterproof adhesive film 7, to deform the waterproof adhesive film toward the bottom housing portion 4. After an external force is removed, the touch component could restore under an action of the waterproof adhesive film 7.

At least one pressure sensor module is provided between the touch component and the bottom housing portion 4 and configured to generate a pressure signal that represents a pressure degree according to the pressing on the touch component.

In a specific embodiment of the present disclosure, the pressure sensor module is mounted on the bottom housing portion 4. A displacement generated by the touch component compressing the waterproof adhesive film 7 can act on the pressure sensor module between the bottom housing portion 4 and the touch component, such that the pressure sensor module outputs a pressure signal that represents the pressure degree on the touch component. In a preferred embodiment, the pressure sensor module comprises a circuit board 6 and a pressure sensor 5 electrically connected to the circuit board 6. The circuit board 6 may be an FPCB (Flexible Printed Circuit Board) and could be provided at an upper end of the bottom housing portion 4. The pressure sensor 5 is connected to the circuit board 6, so that a signal output by the pressure sensor 5 could be transmitted to a control end through the circuit board 6.

As the touch component is supported on the waterproof adhesive film, the waterproof adhesive film could provide an elastic force for the touch component to restore. As the edge of the waterproof adhesive film is secured to the position where the front housing portion is connected to the bottom housing portion, and the touch component could be completely isolated from the bottom housing portion by the waterproof adhesive film, even if a gap exists between the touch component and the housing, water will not enter the bottom housing portion through the waterproof adhesive film. Thus, water resistance of the key module is achieved. The key module could be conveniently mounted on an external terminal for use and is superior and reliable in performance.

In a preferred embodiment of the present disclosure, a raised column 9 to be in contact and matched with the pressure sensor 5 is provided in a position of the lower end of the touch component directly facing the pressure sensor 5. The raised column 9 and the touch component could be integrally formed. As the raised column 9 matches with the pressure sensor 5, a distance between the touch component and the pressure sensor 5 could be significantly shortened.

During installation, the waterproof adhesive film 7 could be adhered to the bottom housing portion 4. Then, the bottom housing portion 4 is mounted on the front housing portion 1. The waterproof adhesive film 7 is tightly pressed to be in a pre-tensioned status. The waterproof adhesive film 7 could cover a lower end face of the touch component, so that the touch component could be supported on the waterproof adhesive film 7. The waterproof adhesive film 7 could also be bonded to the lower end face of the touch component by means of glue. The waterproof adhesive film 7 has a shape matching with that of the lower end face of the touch component, so that the waterproof adhesive film 7 forms an embossed structure 11 which has a shape matching with that of the raised column 9 at a position corresponding to the raised column 9 of the touch component. The raised column 9 is wrapped by the embossed structure 11 to realize integrity of the waterproof adhesive film 7. Thus, water resistance of the key module is guaranteed.

There may be one, two or more than two pressure sensors. In a specific embodiment of the present disclosure, there are two pressure sensors, namely a first pressure sensor and a second pressure sensor. The first pressure sensor and the second pressure sensor are respectively distributed at two ends of the touch component. It is important to note that "two ends" here not only includes two end positions of the touch component but also should be understood as two sides in a length or width direction of the touch component, such as top, bottom, left, right, front and back.

Referring to a view direction of FIG. 1, for example, when a position on the touch plate close to the first pressure sensor is stressed, the touch component as a whole moves downwards. An end on the touch component close to the first pressure sensor is displaced more, and the other end on the touch component away from the first pressure sensor is displaced less. That is, the whole touch component moves like a "seesaw", which ensures that pressure on the first pressure sensor from the touch component is higher than that on the second pressure sensor. Thus, the first pressure sensor and the second pressure sensor could output different pressure signals. A stressed location point on the touch component could be obtained through follow-up calculation. Accordingly, a human gesture could be judged. Based on the same principle, when a position on the touch plate close to the second pressure sensor is stressed, the pressure on the first pressure sensor from the touch component is lower than that on the second pressure sensor. A stressed location point on the touch component could be obtained through the follow-up calculation. Accordingly, a human gesture could be judged.

Alternatively, there may be one pressure sensor 5 located in the middle of the touch component, so that the key module could be applied to the field of control switches, for example, could be applied to a lamp with a single-contact switch. By controlling functional parameters, for example, functions such as a continuous slight pressing touch for dimming and a forced pressing touch for brightening could be experienced, thus improving overall performance of an intelligent lighting switch.

According to the key module, a limiting column 8 could be further provided between the bottom housing portion 4 and the touch component, could be secured to the bottom housing portion 4 and could extend toward the touch component. Certainly, the limiting column 8 could also be provided on the touch component and extend toward the bottom housing portion 4. By means of the limiting column 8, the pressure sensor 5 could be prevented from being damaged when the touch component is excessively pressed. At this time, the waterproof adhesive film 7 needs to form an embossed structure which has a shape matching with that of the limiting column 8 at a position corresponding to the limiting column 8. Thus, the limiting column 8 is wrapped to guarantee integrity of the waterproof adhesive film 7.

A second seal ring surrounding the opening of the inner chamber of the housing could further be provided on an end face of the front housing portion 1 to be connected to the external terminal. Thus, sealing property of the key module from the external terminal could be achieved. Waterproof and dustproof capacities of the key module are improved.

Although some specific embodiments of the present disclosure have been demonstrated in detail with examples, it should be understood by a person skilled in the art that the above examples are only intended to be illustrative but not to limit the scope of the present disclosure. It should be understood by those skilled in the art that the above embodiments could be modified without departing from the scope and spirit of the present disclosure. The scope of the present disclosure is defined by the appended claims.

The invention claimed is:

1. A waterproof key module, comprising:
   a housing with a hollow inner chamber and an opening at an end, comprising a front housing portion and a bottom housing portion secured to each other, and the opening of the housing being provided on the front housing portion;
   a touch component limited in the inner chamber of the housing, comprising a touch plate extending out from the opening of the inner chamber of the housing; and
   a waterproof adhesive film in a pre-tensioned status and isolating the touch component from the bottom housing portion, an edge of the waterproof adhesive film being secured to a position where the front housing portion is connected to the bottom housing portion, and the touch component being supported on the waterproof adhesive film,
   wherein at least one pressure sensor module is provided between the touch component and the bottom housing portion and configured to generate a pressure signal that represents a pressure degree according to a pressing on the touch component,
   wherein a first seal ring surrounding the inner chamber is provided in the position where the front housing portion is connected to the bottom housing portion, and
   wherein a second seal ring surrounding the opening of the inner chamber of the housing is further provided in a position on an end face of the front housing portion to be connected to an external terminal.

2. The key module according to claim 1, wherein the touch component further comprises a flange structure provided at a lower edge of the touch plate, and is clamped in a stepped structure provided at the opening of the inner chamber of the housing by means of the flange structure.

3. The key module according to claim 1, wherein the pressure sensor module comprises a circuit board and a pressure sensor electrically connected to the circuit board.

4. The key module according to claim 3, wherein the pressure sensor module is secured to the bottom housing portion, and a raised column to be in contact and matched with the pressure sensor is provided in a position of a lower end of the touch component directly facing the pressure sensor.

5. The key module according to claim 4, wherein the waterproof adhesive film covers a lower end face of the touch component, and an embossed structure which has a shape matching with that of the raised column is formed at a position of the waterproof adhesive film corresponding to the raised column.

6. The key module according to claim 5, wherein the pressure sensor comprises two pressure sensors, namely a first pressure sensor and a second pressure sensor, and the first pressure sensor and the second pressure sensor are respectively located at two ends of the touch component.

7. The key module according to claim 1, wherein a limiting column is further provided between the bottom housing portion and the touch component.

8. The key module according to claim 7, wherein the limiting column is secured to a lower end of the touch component and extends toward the bottom housing portion.

\* \* \* \* \*